US009659404B2

(12) United States Patent
Burley et al.

(10) Patent No.: US 9,659,404 B2
(45) Date of Patent: May 23, 2017

(54) NORMALIZED DIFFUSION PROFILE FOR SUBSURFACE SCATTERING RENDERING (71) Applicant: Disney Enterprises, Inc., Burbank, CA (US)

(72) Inventors: Brent Burley, Burbank, CA (US); Andrew Selle, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 739 days.

(21) Appl. No.: 13/840,814

(22) Filed: Mar. 15, 2013

(65) Prior Publication Data
US 2014/0267274 A1    Sep. 18, 2014

(51) Int. Cl.
*G06T 15/50* (2011.01)

(52) U.S. Cl.
CPC .................. *G06T 15/506* (2013.01)

(58) Field of Classification Search
None
See application file for complete search history.

(56) References Cited

U.S. PATENT DOCUMENTS

| 2006/0290719 | A1* | 12/2006 | Tong et al. .................. 345/694 |
| 2007/0008310 | A1* | 1/2007 | Hahn ................... G06T 15/506 345/419 |
| 2008/0255812 | A1* | 10/2008 | Hery ................................ 703/2 |
| 2009/0109221 | A1* | 4/2009 | Planck et al. ................. 345/426 |
| 2009/0219287 | A1* | 9/2009 | Wang et al. .................. 345/426 |
| 2014/0198204 | A1* | 7/2014 | Papas et al. .................. 348/135 |
| 2014/0204087 | A1* | 7/2014 | Habel ................... G06T 15/506 345/426 |

OTHER PUBLICATIONS

"Adaptive Cumulative Numerical Distribution Functions for Efficient Importance Sampling", Eurographics Symposium on Rendering (2005), Jun. 2005.*
J. Stam; "Multiple scattering as a diffusion process", Eurographics Rendering Workshop, pp. 41-50, 1995.
H.W. Jensen; J. Buhler; "A Rapid Hierarchical Rendering Technique for Translucent Materials", ACM Transactions on Graphics (TOG), vol. 21 Issue 3, pp. 576-581, Jul. 2002.

(Continued)

*Primary Examiner* — James A Thompson
(74) *Attorney, Agent, or Firm* — Patterson + Sheridan, LLP

(57) ABSTRACT

The disclosure provides an approach for rendering images which include subsurface scattering effects. In one aspect, a shader computes subsurface scattering effects via a ray-tracing or point-based technique using a normalized diffusion profile. The shader may use the inverse of a cumulative density function associated with the normalized diffusion profile to determine, for each ray intersecting the surface, points on the surface at which to evaluate the normalized diffusion profile. To determine the lit surface of a pixel due to subsurface scattering, the shader may multiply the result of the integral of the normalized diffusion profile for each of the R, G, and B color components by corresponding components of a diffuse color constant. Further, the shader may scale the integral of the normalized diffusion profile based on a scaling function which accounts for a forward-scattering nature of a medium and compensates for out-of-plane scattering.

23 Claims, 4 Drawing Sheets

A

B (56) References Cited

OTHER PUBLICATIONS

H.W. Jensen; S. Marschner; M. Levoy; P. Hanrahan, "A Practical Model for Subsurface Light Transport", In SIGGRAPH '01: Proceedings of the 28th annual conference on Computer graphics and interactive techniques, pp. 511-518, 2001.

E. D'Eon; G. Irving, "A Quantized-Diffusion Model for Rendering Translucent Materials", ACM Transactions on Graphics (TOG)—Proceedings of ACM SIGGRAPH, vol. 30 Issue 4, Article No. 56, Jul. 2011.

* cited by examiner

NORMALIZED DIFFUSION PROFILE FOR SUBSURFACE SCATTERING RENDERING

BACKGROUND

Field

Aspects presented herein provide techniques for rendering images.

Description of the Related Art

Rendering realistic images from virtual models requires accounting for light scattering events though the volumes of some models and the resulting light transport between points on the surfaces of the models. Such scattering, often referred to as "subsurface scattering," is prevalent in translucent media such as human flesh and skin, snow, plastics, foods, cloth, and marble. Subsurface scattering tends to soften the features of media, cause colors to bleed within media, and permit light to diffuse across shadow edges. For example, the shadows in human ears may appear reddish rather than entirely black due to subsurface scattering effects.

For efficiency purposes, a diffusion approximation is typically used to render images which include subsurface scattering. Diffusion models approximate the cumulative effect of multiple scattering events within a volume, without simulating individual scattering events. Currently, the most widely used diffusion model is the dipole model, though other diffusion models have recently gained favor. These diffusion models make a number of simplifying assumptions, such as that the surface of the media is a flat surface bounding a slab of finite or semi-infinite thickness, that the media has a homogenous composition, and that the incident light is orthogonal to the surface, with the outgoing angle of the light out of the media often ignored.

SUMMARY

One aspect includes a computer implemented method for rendering an image which includes subsurface scattering effects. The method includes evaluating, for each of one or more points on a surface, at least an integral of an integrand over a surface to estimate light transport to the one or more points on the surface, where the integrand includes a normalized diffusion profile. The method further includes determining total outgoing radiance at each of the one or more points by adding the respective evaluated integrals to other respective lighting terms.

Other aspects include a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited aspects are attained and can be understood in detail, a more particular description of aspects of the disclosure, briefly summarized above, may be had by reference to the appended drawings.

It is to be noted, however, that the appended drawings illustrate only typical aspects of this disclosure and are therefore not to be considered limiting of its scope.

DETAILED DESCRIPTION

Figure 1:
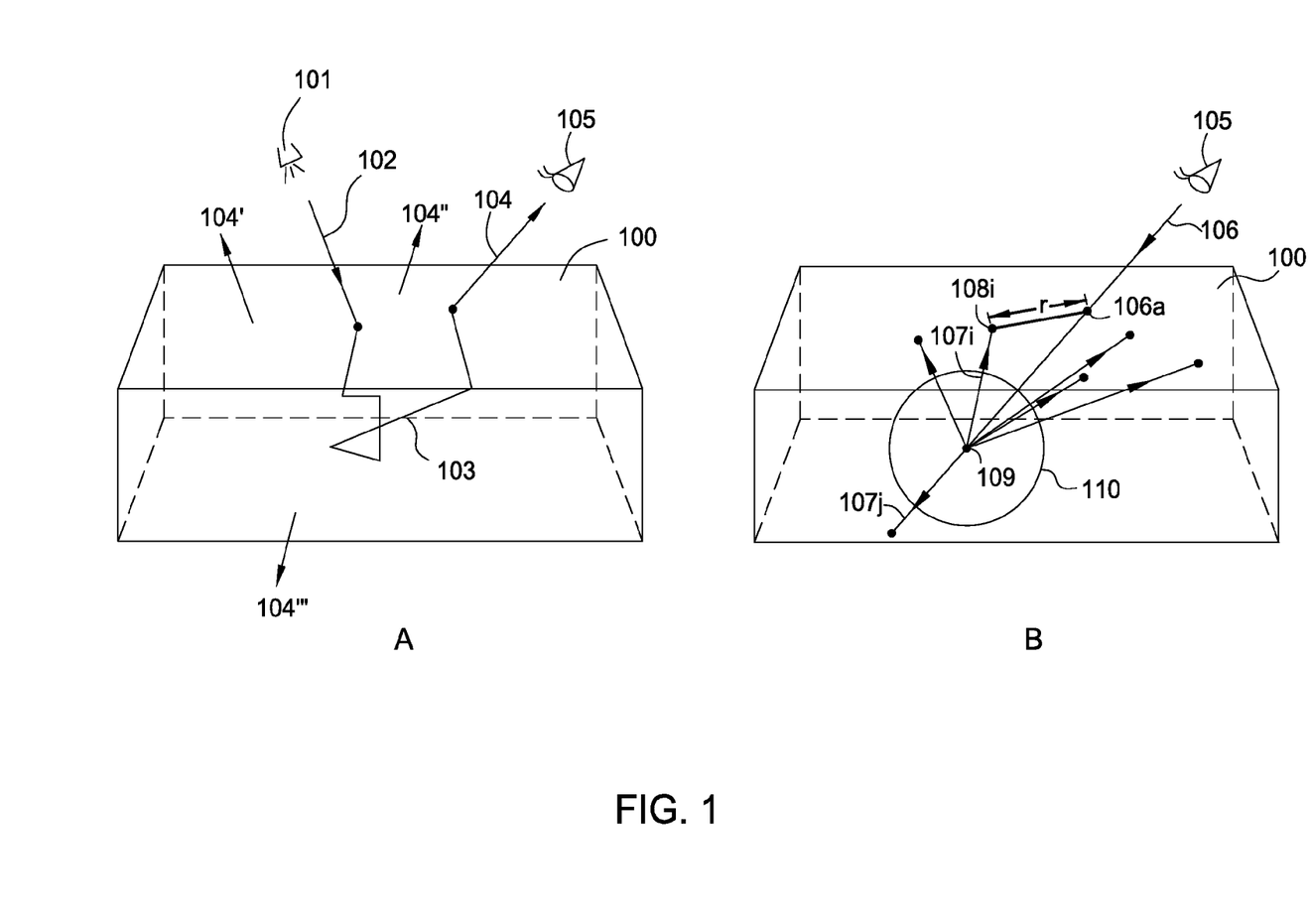
FIG. 1 illustrates an approach for determining subsurface scattering effects.

FIG. 1 illustrates an approach for determining subsurface scattering effects. As shown in panel A, a light ray 102 which is incident on the surface of a media 100 enters the volume 100 and scatters within the volume 100 before exiting in part as light ray 104, which a viewer 105 (e.g., a camera) sees. Although only one scattering path 103 is depicted, multiple subsurface scattering events may occur along different paths in the volume 100, with light from such scattering events transported through the volume 100 and outgoing at multiple points and in multiple directions as light rays 104', 104'', 104''', etc.

Current diffusion models, which approximate the effects of multiple subsurface scattering events (e.g., along scattering path 103), can produce unrealistic and undesirable results. For example, shadows in human skin rendered using the dipole model sometimes include incorrect cyan bands. Another limitation of current diffusion models is that they only consider scattering in a surface plane on which light is incident and neglect forward scattering of light through thin objects. For highly-forward scattering media such as skin, neglecting forward scattering results in overly dark transmission of light. As a result, the scattering transmission of light through human ears, nostrils, and the like are often underestimated. Yet another limitation of current diffusion models is that current approximations of the diffusion equation are not integrable or invertible. As a result, the lit surface colors that are produced using such models are difficult for artists to control, and it is also difficult to importance sample to determine points for evaluating the diffusion approximation.

As shown in panel B, a shader (not shown) rendering an image which includes subsurface scattering effects may trace a ray 106 from a camera 105 into the volume 100 up to a point 109. Here, the point 109 may be located at any distance within the media. For example, the point 109 may be located half-way between two surfaces (e.g., the upper and lower surfaces) of the volume 100. The shader may further trace multiple (e.g., 500) rays $107_i$ out from the point 190. Illustratively, the rays 107_which are traced out are uniformly distributed on a sphere 110 having the point 109 as its center. Other distributions may be used in alternative configurations. For explanatory purposes, aspects are described herein primarily with respect to ray tracing, although techniques disclosed herein are equally applicable to other rendering approaches.

As shown, the light rays (e.g., light ray $107_i$) which are traced out from the point 190 intersect the model 100 at various points (e.g., point $108_i$). At each such intersection point, the shader may compute a distance r from a point 106a at which the incident ray 106 intersects the surface to the intersection point (e.g., point $108_i$) of the outgoing light ray (e.g., light ray $107_i$). The shader may then evaluate a normalized diffusion profile at the intersection point of the outgoing light array. As used herein, a diffusion profile (also referred to as a "diffusion function") is a function which, given an input radius from a point at which light is incident on a surface, outputs an amount of that light which exits a point on the surface at the radius away from the point at which light is incident.

In one configuration, the normalized diffusion function may be of the form $$R_d(r) = \frac{1}{(2\pi(ab+cd))}\left[a\frac{e^{-r/b}}{r} + c\frac{e^{-r/d}}{r}\right], \quad (1)$$

where r is the distance between the intersection points and a, b, c, and d are constants, with b, d, and at least one of a and c being positive. Dividing, rather than multiplying, by b and d means that these constants have the same units as r (e.g. inches instead of inverse inches). The integral of $R_d(r)$ over all radii in the plane $R_d = 2\pi \int_0^\infty R_d(r)rdr$ assuming uniform incident lighting (also referred to as the "albedo") evaluates to 1, i.e., $R_d(r)$ is normalized to 1. Here, $$\frac{1}{(2\pi(ab+cd))}$$

is the normalization constant that ensures $R_d(r)$ integrates to 1. In addition, in one configuration, the ratio of the constants b and d may be fixed at 3 (or approximately 3), which experience has shown tends to produce realistic and pleasing images. Further fixing the ratio of a to c (e.g., a=c) leaves one free parameter d corresponding to overall scattering distance, which may be adjusted as desired by an artist. The normalized diffusion function may thus simplify to:

$$R_d(r) = \frac{1}{(8\pi d)}\left[\frac{e^{-r/3d}}{r} + \frac{e^{-r/d}}{r}\right]. \quad (2)$$

Note, an integral of $R_d(r)$ giving outgoing radiance due to subsurface scattering may be added into the standard rendering equation as an additional term:

$$L_o(x_o, \vec{\omega}_o) = L_e(x_o, \vec{\omega}_o) + \int_\Omega f_r(x, \vec{\omega}_i, \vec{\omega}_o)L_i(x_o, \vec{\omega}_i)(-\vec{\omega}_i \cdot \vec{n}_i)d\omega_i + L_s(x_o, \vec{\omega}_o), \quad (3)$$

where $L_o(x_o, \vec{\omega}_o)$ is the outgoing radiance at point $x_o$ having direction $\vec{\omega}_o$, $L_e$ is an emitted light term, $f_r(x, \vec{\omega}_i, \vec{\omega}_o)$ is a bidirectional reflectance distribution function (BRDF), $L_i(x_o, \vec{\omega}_i)$ is the incoming light at $x_o$ having direction $\vec{\omega}_i$, $(-\vec{\omega}_i \cdot \vec{n}_i)$ is a normal attenuation, and $L_s(x_o, \vec{\omega}_o)$ is an outgoing radiance due to subsurface scattering. Other lighting terms may also be added to the rendering equation, as appropriate.

In general, the subsurface scattering $L_s(x_o, \vec{\omega}_o)$ term may be determined by integrating incident radiance $L_i(x_i, \vec{\omega}_i)$ at $x_i$ having direction $\vec{\omega}_i$ times a bidirectional surface scattering distribution function (BSSRDF) $S(x_i, \vec{\omega}_i; x_o, \vec{\omega}_o)$ over incident directions and area A:

$$L_s(x_o, \vec{\omega}_o) = \int_A \int_{2\pi} S(x_i, \vec{\omega}_i; x_o, \vec{\omega}_o)L_i(x_i, \vec{\omega}_i)(\vec{n}_i \cdot \vec{\omega}_i)d\vec{\omega}_i dA(x_i) \quad (4)$$

This integral is computationally intractable, however. Using $R_d(r)$, equation (4) may be simplified to:

$$L_s(x_o, \vec{\omega}_o) = \int_A \int_{2\pi} R_d(r)L_i(x_i, \vec{\omega}_i)d\vec{\omega}_i dA(x_i), \quad (5)$$

with r being the distance between $x_i$ and $x_o$ (i.e., $\|x_i - x_o\|$), and $R_d(r)$ given by equation (1).

The integral of equation (5) may be evaluated numerically using samples of $R_d(r)$ taken at a number of surface points around the outgoing light location $x_o$. As shown in FIG. 1, the sample locations are determined by tracing rays out from a point within the volume and finding the intersections of such rays with the surface. In alternative aspects, sample locations may be predefined or determined in other ways. In one aspect, the sample locations may be determined via importance sampling, with sample points generated using a distribution matching the normalized diffusion profile. Doing so emphasizes points for which light transport is more salient based on the diffusion profile (e.g., points closer to the sampling point), and vice versa. In particular, $R_d(r)$ is analytically integrable and may be integrated to obtain a cumulative density function (CDF):

$$CDF(r) = 2\pi \int_0^r \frac{1}{(2\pi(ab+cd))}\left[a\frac{e^{-\frac{r}{b}}}{r} + c\frac{e^{-\frac{r}{d}}}{r}\right]rdr \quad (6)$$

$$= 1 - \frac{1}{(ab+cd)}[abe^{-r/b} + cde^{-r/d}].$$

The CDF has domain $[0, \infty]$ and range $[0, 1]$, and the inverse of the CDF thus has domain $[0, 1]$ and range $[0, \infty]$. The shader may plug a random number between 0 and 1 into the inverse of the CDF to determine radii at which to take samples. By further randomly generating a sampling angle, the shader may obtain a point on the surface at which to evaluate the normalized diffusion profile for the lighting integral. That is, the shader may trace a ray towards the volume, and, where that ray intersects the model, sample at surrounding locations at random angles and radii determined using the inverse of the CDF. Note, the area represented by each sample, i.e., the term $dA(x_i)$, must still be determined to evaluate the integral of equation (5) if the sampled surface is non-planar. This may be accomplished using well-known techniques in importance sampling. As another caveat, the importance sampling discussed above is in the plane. In some aspects, importance sampling based on a normalized diffusion profile may also be performed for other surfaces, such as a sphere.

In yet another configuration, the subsurface scattering term may account for the highly forward-scattering nature of some media (e.g., skin) and the differences in scattering due to the shape of the surface (e.g., convex surfaces may cause increased scattering as compared to planar surfaces) using a scaling function which compensates for out-of-plane scattering, i.e., compensates for inaccuracies due to the in-plane scattering assumption made in the diffusion profile $R_d(r)$. In one configuration, the scaling function may increase the outgoing radiance due to subsurface scattering based on the direction and position of the incident and outgoing light. In such a case, the subsurface scattering term may take the form:

$$L_s(x_o, \vec{\omega}_o) = \int_A \int_{2\pi} R_d(r)f_{bc}(\vec{n}_i, \vec{n}_o, x_i, x_o)L_i(x_i, \vec{\omega}_i)(\vec{n}_i \cdot \vec{\omega}_i)d\vec{\omega}_i dA(x_i), \quad (7)$$

where $f_{bc}(\vec{n}_i, \vec{n}_o, x_i, x_o)$ is a backside compensation function of the surface normals at the incident and outgoing locations, $\vec{n}_i$ and $\vec{n}_o$, respectively, as well as the incident $x_i$ and outgoing $x_o$ light locations themselves. For forward-scattering media, $f_{bc}$ may be chosen such that a surface opposite that on which light is incident is brighter than the surface on which light is incident for equivalent scattering distances. For example, if the normals $\vec{n}_i$, $\vec{n}_o$ are aligned and the points $x_o$, $x_i$ on opposite sides of parallel planes (i.e., the dot product $\vec{n}_i \cdot \vec{n}_o$ is −1 and the dot product $(x_o-x_i)\cdot\vec{n}_i$ is −1, while the dot product $(x_o-x_i)\cdot\vec{n}_o$ is 1), then the function $f_{bc}$ may output a constant positive scaling factor s. Conversely, if the normals $\vec{n}_i$, $\vec{n}_o$ are aligned and the points $x_o$, $x_i$ on the same plane (i.e., the dot product $\vec{n}_i \cdot \vec{n}_o$ is 1 and the dot products $(x_o-x_i)\cdot\vec{n}_i$ and $(x_o-x_i)\cdot\vec{n}_o$ are 0), then the function $f_{bc}$ may output 1 (i.e., no scaling is performed). If the points $x_i$, $x_o$ or the normals $\vec{n}_i$, $\vec{n}_o$ are between these extremes in terms of position or orientation, respectively, then the function $f_{bc}$ may output a value between 1 and s. The particular constant s and function $f_{bc}$ used may vary for different media having different forward-scattering properties, and may be, e.g., specified by an artist or determined based on Monte-Carlo simulations of subsurface scattering.

In yet another aspect, the shader may multiply the integral of equation (5), computed for separate red, green, and blue (RGB) normalized diffusion profiles, by components of a diffuse color constant $M(x_o)$ at point $x_o$, which may be, e.g., provided by an artist. That is, the shader may multiply the R, G, and B components of the diffuse color constant $M(x_o)$ by corresponding integrals of normalized diffusion profiles (note, this is the same as multiplying the normalized diffusion profiles for the R, G, and B components by corresponding components of $M(x_o)$ and then integrating). Doing so incorporates color information into the rendering of the subsurface scattering effect to produce a lit surface color. Previous diffusion approximations, such as the dipole model, rely upon diffusion profile functions which were uninvertible. As a result, the desired lit surface colors were typically produced using numeric, tabular inversion that may be less accurate while adding computational costs. In contrast, diffusion profiles according to aspects presented herein are normalized, so inversion of the diffusion profile function is unnecessary and the result of integration may simply be multiplied by the appropriate component of the diffuse color constant $M(x_o)$.

Figure 2:
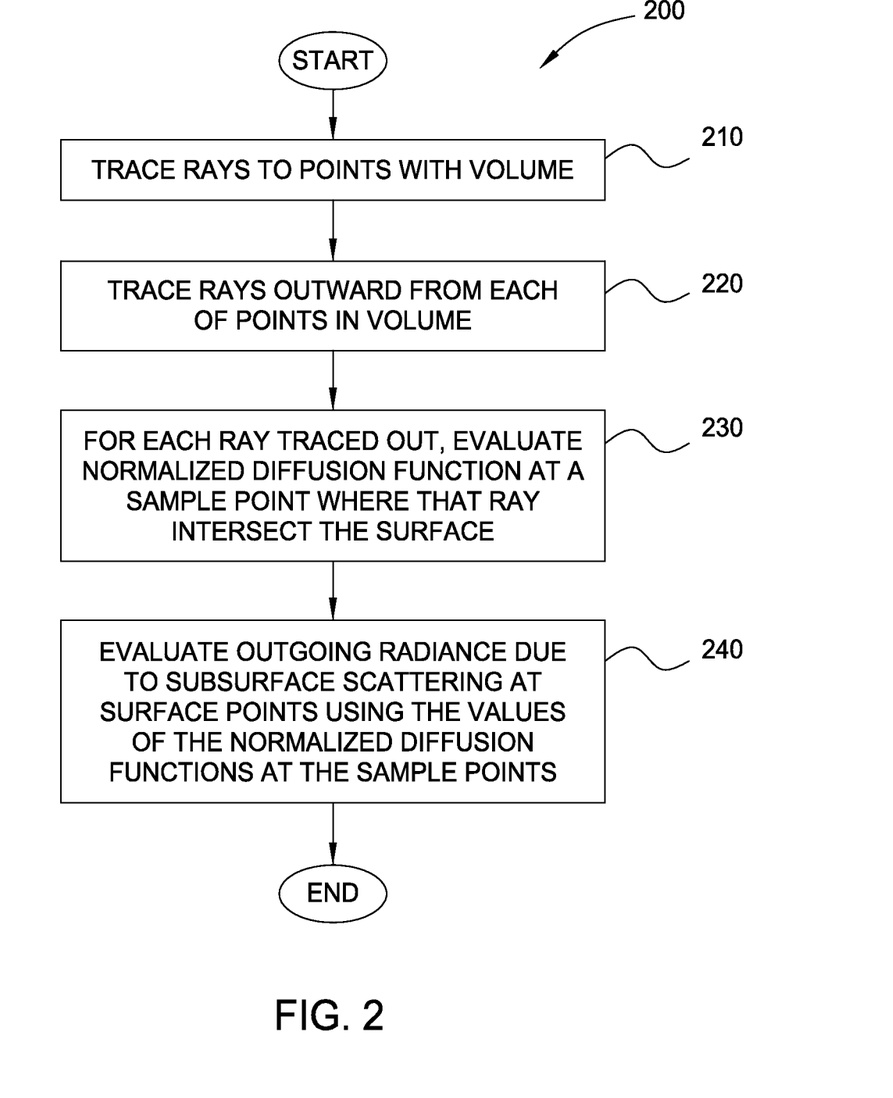
FIG. 2 illustrates a method for rendering an image which includes subsurface scattering effects using a normalized diffusion profile.

FIG. 2 illustrates a method 200 for rendering an image which includes subsurface scattering effects using a normalized diffusion profile, according to an aspect. As shown, the method 200 begins at step 210, where a shader traces rays from a camera to points within a volume. As discussed, the points within the volume may be at any distance within the volume, such as half-way between opposing surfaces of the volume.

At step 220, the shader traces rays out from each of the points within the model. These rays are used to determine sampling locations for evaluating a normalized diffusion function at the surface. For example, the shader may trace out 500 to 1000 rays for each subsurface point to determine that number of sampling locations. In one configuration, the rays traced out from a subsurface point may be uniformly distributed on a sphere having the point as its center. In alternative configurations, other distributions of the rays may be used.

For each ray traced out, the shader evaluates, at step 230, a normalized diffusion function where the ray intersects the model. In one configuration, the normalized diffusion function may have the form $$R_d(r) = \frac{1}{(2\pi(ab+cd))}\left[a\frac{e^{-r/b}}{r} + c\frac{e^{-r/d}}{r}\right],$$

where a, b, c, and d are constants, with b, d, and at least one of a and c being positive. As discussed, $R_d(r)$ is normalized such that it integrates over the plane to 1. In one configuration, the ratio of the constants b and d may be fixed at 3 (or approximately 3), which experience has shown tends to produce realistic and pleasing images. Further fixing the ratio of a to c (e.g., a=c) leaves one free parameter d corresponding to overall scattering distance, which may be adjusted as desired by an artist. The normalized diffusion function may thus simplify to $$R_d(r) = \frac{1}{(8\pi d)}\left[\frac{e^{-r/3d}}{r} + \frac{e^{-r/d}}{r}\right].$$

In one configuration, the normalized diffusion function $R_d(r)$ may be scaled using a backside compensation scaling function $f_{bc}(\vec{n}_i, \vec{n}_o, x_i, x_o)$ which compensates for out-of-plane scattering, i.e., compensates for inaccuracies due to the in-plane scattering assumption made in the diffusion profile $R_d(r)$. For example, $f_{bc}$ may account for the forward-scattering nature of some media and differences in scattering due to the shape of the surface (e.g., convex surfaces may cause increased scattering as compared to planar surfaces). $f_{bc}$ is a function of the surface normals at the incident and outgoing locations $\vec{n}_i$ and $\vec{n}_o$, respectively, as well as the incident $x_i$ and outgoing $x_o$ locations themselves. For forward-scattering media, ft, may be chosen such that a surface opposite that on which light is incident is brighter than the surface on which light is incident for equivalent scattering distances. For example, if the normals $\vec{n}_i$, $\vec{n}_o$ are aligned and the points $x_o$, $x_i$ on opposite sides of parallel planes (i.e., the dot product $\vec{n}_i \cdot \vec{n}_o$ is −1 and the dot product $(x_o-x_i)\cdot\vec{n}_i$ is −1, while the dot product $(x_o-x_i)\cdot\vec{n}_o$ is 1), then the function $f_{bc}$ may output a constant positive scaling factors. Here, s>1 and a particular s and function $f_{bc}$ may be, e.g., specified by an artist or determined based on Monte-Carlo simulations of subsurface scattering. Conversely, if the normals $\vec{n}_i$, $\vec{n}_o$ are aligned and the points $x_o$, $x_i$ on the same plane (i.e., the dot product $\vec{n}_i \cdot \vec{n}_o$ is 1 and the dot products $(x_o-x_i)\cdot\vec{n}_i$ and $(x_o-x_i)\cdot\vec{n}_o$ are 0), then the function $f_{bc}$ may output 1 (i.e., no scaling is performed). If the points $x_i$, $x_o$ or the normals $\vec{n}_i$, $\vec{n}_o$ are between these extremes in terms of position or orientation, respectively, then the function $f_{bc}$ may output a value between 1 and s.

At step 240, the shader evaluates outgoing radiances due to subsurface scattering $L_s(x_o, \vec{\omega}_o)$ at surface points where the incident rays intersect the surface using the values of the normalized diffusion function at the sample points determined at step 330. As discussed, $L_s(x_o, \vec{\omega}_o)$ may generally take the form of equation (4), which may be simplified to equation (5) and numerically integrated using the values of $R_d(r)$ at the sample points. Although discussed as separate steps, the computations of the values of $R_d(r)$ at sample points may be performed as part of evaluating $L_s(x_o, \vec{\omega}_o)$ via numerical integration.

Having obtained the outgoing radiance due to subsurface scattering $L_s(x_o, \vec{\omega}_o)$, the shader may further evaluate $L_o(x_o, \vec{\omega}_o)$, the total outgoing radiance at the point $x_o$ having direction $\vec{\omega}_o$. As discussed, $L_s(x_o, \vec{\omega}_o)$ may be included in the standard rendering equation as an additional term:

$$L_o(x_o, \vec{\omega}_o) = L_e(x_o, \vec{\omega}_o) + \int_\Omega f_r(x, \vec{\omega}_i, \vec{\omega}_o) L_i(x_o, \vec{\omega}_i)(-\vec{\omega}_i \cdot \vec{n}_i) d\omega_i + L_s(x_o, \vec{\omega}_o). \qquad (8)$$

The shader may determine the value of the emitted light term $L_e(x_o, \vec{\omega}_o)$ and the integral $\int_\Omega f_r(x, \vec{\omega}_i, \vec{\omega}_o) L_i(x_o, \vec{\omega}_i)(-\vec{\omega}_i \cdot \vec{n}_i) d\omega_i$ using any feasible means, including well-known techniques. The shader may then add these values to the value of $L_s(x_o, \vec{\omega}_o)$ to obtain the total going radiance $L_o(x_o, \vec{\omega}_o)$.

In one configuration, the shader may multiply $L_s(x_o, \vec{\omega}_o)$, computed for each of the R, G, and B color components, by corresponding components of a diffuse color constant $M(x_o)$ at point $x_o$, which may be, e.g., provided by an artist. Doing so incorporates color information into the rendering of the subsurface scattering effect to produce a lit surface color. As discussed, previous diffusion approximations, such as the dipole model, rely upon diffusion profile functions which were uninvertible, and, as a result, artist-desired colors were typically produced using numeric, tabular inversion that may be less accurate while adding computational costs. In contrast, diffusion profiles according to aspects presented herein are normalized, so inversion of the diffusion profile function is unnecessary and the result of integration may simply be multiplied by the appropriate component of the diffuse color constant $M(x_o)$.

Figure 3:
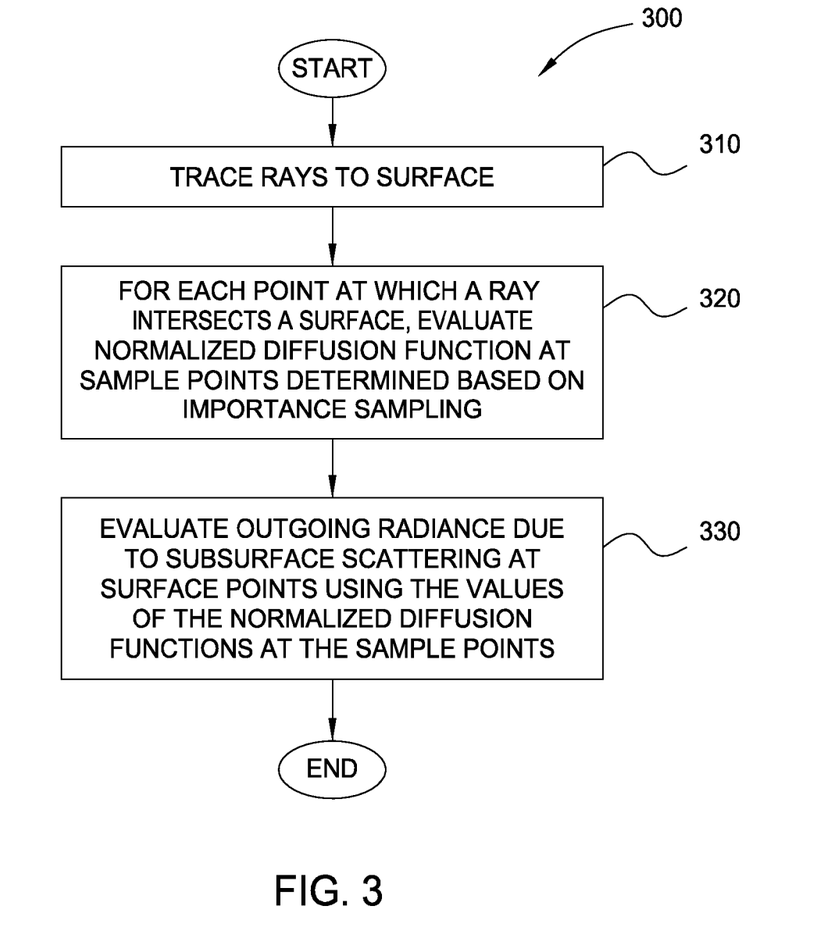
FIG. 3 illustrates an alternative method for rendering an image which includes subsurface scattering effects using a normalized diffusion profile.

FIG. 3 illustrates an alternative method 300 for rendering an image which includes subsurface scattering effects using a normalized diffusion profile, according to a configuration. As shown, the method 300 begins at step 310, where the shader traces rays to a surface of a volume from a camera. At step 320, the shader evaluates a normalized diffusion function at sample points on the surface determined based on importance sampling. As discussed, the sample points may be generated with a distribution matching the normalized diffusion profile. In particular, $R_d(r)$ is analytically integrable and may be integrated to obtain a cumulative density function (CDF):

$$CDF(r) = 2\pi \int_0^r \frac{1}{(2\pi(ab+cd))} \left[ a\frac{e^{-\frac{r}{b}}}{r} + c\frac{e^{-\frac{r}{d}}}{r} \right] r \, dr \qquad (9)$$

$$= 1 - \frac{1}{(ab+cd)} [abe^{-r/b} + cde^{-r/d}].$$

The CDF has domain $[0, \infty]$ and range $[0,1]$, and the inverse of the CDF thus has domain $[0,1]$ and range $[0, \infty]$. The shader may plug a random number between 0 and 1 into the inverse of the CDF to determine radii at which to take samples. By further randomly generating a sampling angle, the shader may obtain a point on the surface at which to evaluate the normalized diffusion profile for the lighting integral. That is, the shader may trace a ray towards the volume, and, where that ray intersects the model, sample the value of $R_d(r)$ at surrounding locations which are at random angles and radii determined using the inverse of the CDF.

In one configuration, the normalized diffusion function $R_d(r)$ used may have the form $$R_d(r) = \frac{1}{(2\pi(ab+cd))} \left[ a\frac{e^{-r/b}}{r} + c\frac{e^{-r/d}}{r} \right],$$

where a, b, c, and d are constants, with b, d, and at least one of a and c being positive. In another configuration, the ratio of the constants b and d may be fixed at 3 (or approximately 3), which experience has shown tends to produce realistic and pleasing images. Further fixing the ratio of a to c (e.g., a=c) leaves one free parameter d corresponding to overall scattering distance, and the normalized diffusion function may thus simplify to $$R_d(r) = \frac{1}{(8\pi d)} \left[ \frac{e^{-r/3d}}{r} + \frac{e^{-r/d}}{r} \right].$$

In one configuration, the normalized diffusion function $R_d(r)$ may be scaled using a backside compensation scaling function $f_{bc}(\vec{n}_i, \vec{n}_o, x_i, x_o)$ which compensates for out-of-plane scattering, i.e., compensates for inaccuracies due to the in-plane scattering assumption made in the diffusion profile $R_d(r)$. For example, $f_{bc}$ may account for the forward-scattering nature of some media and the differences in scattering due to the shape of the surface (e.g., convex surfaces may cause increased scattering as compared to planar surfaces). As discussed, the $f_{bc}(\vec{n}_i, \vec{n}_o, x_i, x_o)$ is a function of the surface normals at the incident and outgoing locations $\vec{n}_i$ and $\vec{n}_o$, respectively, as well as the incident $x_i$ and outgoing $x_o$ locations themselves. For forward-scattering media, $f_{bc}$ may be chosen such that a surface opposite that on which light is incident is brighter than the surface on which light is incident for equivalent scattering distances. For example, if the normals $\vec{n}_i, \vec{n}_o$ are aligned and the points $x_o, x_i$ on opposite sides of parallel planes (i.e., the dot product $\vec{n}_i \cdot \vec{n}_o$ is $-1$ and the dot product $(x_o - x_i) \cdot \vec{n}_i$ is $-1$, while the dot product $(x_o - x_i) \cdot \vec{n}_o$ is 1), then the function $f_{bc}$ may output a constant positive scaling factor $s > 1$. Conversely, if the normals $\vec{n}_i, \vec{n}_o$ are aligned and the points $x_o, x_i$ on the same plane (i.e., the dot product $\vec{n}_i \cdot \vec{n}_o$ is 1 and the dot products $(x_o - x_i) \cdot \vec{n}_i$ and $(x_o - x_i) \cdot \vec{n}_o$ are 0), then the function $f_{bc}$ may output 1 (i.e., no scaling is performed). If the points $x_i$, $x_o$ or the normals $\vec{n}_i, \vec{n}_o$ are between these extremes in terms of position or orientation, respectively, then the function $f_{bc}$ may output a value between 1 and s.

At step 330, the shader evaluates an outgoing radiance at surface points due to subsurface scattering $L_s(x_o, \vec{\omega}_o)$ using the values of the normalized diffusion function at the sample points. Similar to step 240, $L_s(x_o, \vec{\omega}_o)$ may generally take the form of equation (4), which may be simplified to equation (5) and numerically integrated using the values of $R_d(r)$ at the sample points. Although discussed as separate steps, the computations of the values of $R_d(r)$ at sample points may be performed as part of evaluating $L_s(x_o, \vec{\omega}_o)$ via numerical integration.

Having obtained $L_s(x_o, \vec{\omega}_o)$, the shader may further evaluate $L_o(x_o, \vec{\omega}_o)$, the total outgoing radiance at the point $x_o$ having direction $\vec{\omega}_o$. In one configuration, $L_s(x_o, \vec{\omega}_o)$ may be included in the standard rendering equation as an additional term to determine $L_o(x_o, \vec{\omega}_o)$:

$$L_o(x_o, \vec{\omega}_o) = L_e(x_o, \vec{\omega}_o) + \int_\Omega f_r(x, \vec{\omega}_i, \vec{\omega}_o) L_i(x_o, \vec{\omega}_i)(-\vec{\omega}_i \cdot \vec{n}_i) d\omega_i + L_s(x_o, \vec{\omega}_o). \quad (10)$$

Here, the area represented by each sample, i.e., the term $dA(x_i)$, may be determined using well-known techniques in importance sampling. In another configuration, the shader may multiply the $L_s(x_o, \vec{\omega}_o)$, computed for each of the R, G and B color components, by a corresponding component of a diffuse color constant $M(x_o)$ at point $x_o$, which may be, e.g., provided by an artist, in order to incorporate this color information into the rendering of the subsurface scattering effect.

Figure 4:
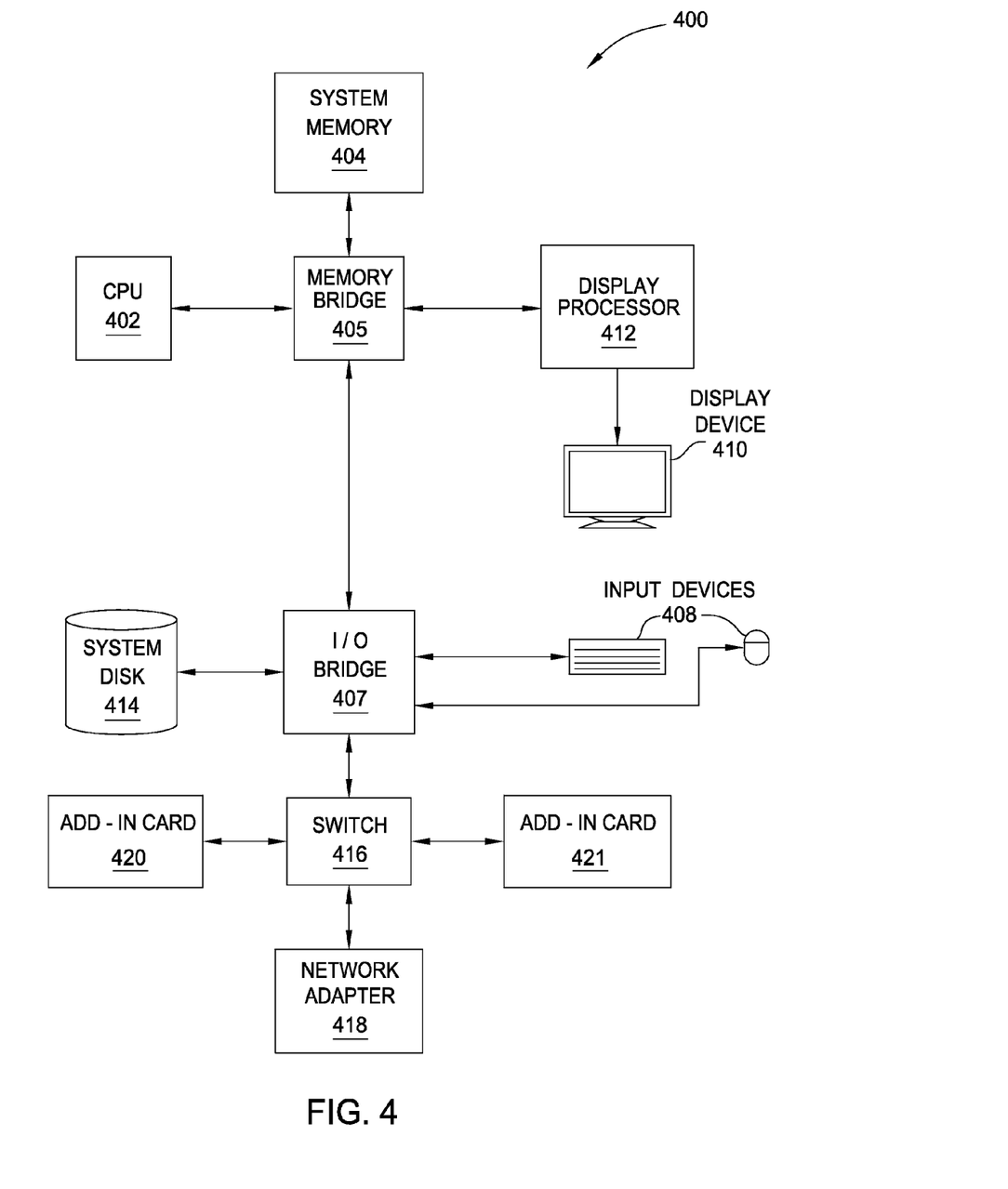
FIG. 4 is a block diagram of a system configured to implement one or more aspects of the disclosure.

FIG. 4 is a block diagram of a system 400 configured to implement one or more aspects. System 400 may be a computer workstation, personal computer, video game console, personal digital assistant, rendering engine, mobile phone, or any other device suitable for practicing one or more aspects.

As shown, system 400 includes a central processing unit (CPU) 402 and a system memory 404 communicating via a bus path that may include a memory bridge 405. CPU 402 includes one or more processing cores, and, in operation, CPU 402 is the master processor of system 400, controlling and coordinating operations of other system components. System memory 404 stores software applications and data for use by CPU 402. CPU 402 runs software applications and optionally an operating system. Memory bridge 405, which may be, e.g., a Northbridge chip, is connected via a bus or other communication path (e.g., a HyperTransport link) to an I/O (input/output) bridge 407. I/O bridge 407, which may be, e.g., a Southbridge chip, receives user input from one or more user input devices 408 (e.g., keyboard, mouse, joystick, digitizer tablets, touch pads, touch screens, still or video cameras, motion sensors, and/or microphones) and forwards the input to CPU 402 via memory bridge 405.

A display processor 412 is coupled to memory bridge 405 via a bus or other communication path (e.g., a PCI Express, Accelerated Graphics Port, or HyperTransport link). In one configuration, display processor 412 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 404.

Display processor 412 periodically delivers pixels to a display device 410 (e.g., a screen or conventional CRT, plasma, OLED, SED or LCD based monitor or television). Additionally, display processor 412 may output pixels to film recorders adapted to reproduce computer generated images on photographic film. Display processor 412 can provide display device 410 with an analog or digital signal.

A system disk 414 is also connected to I/O bridge 407 and may be configured to store content and applications and data for use by CPU 402 and display processor 412. System disk 414 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 416 provides connections between I/O bridge 407 and other components such as a network adapter 418 and various add-in cards 420 and 421. Network adapter 418 allows system 400 to communicate with other systems via an electronic communications network, and may include wired or wireless communication over local area networks and wide area networks such as the Internet.

Other components (not shown), including USB or other port connections, film recording devices, and the like, may also be connected to I/O bridge 407. For example, an audio processor may be used to generate analog or digital audio output from instructions and/or data provided by CPU 402, system memory 404, or system disk 414. Communication paths interconnecting the various components in FIG. 4 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one configuration, display processor 412 incorporates circuitry optimized for graphics and video processing, including, for example, video output circuitry, and constitutes a graphics processing unit (GPU). In another configuration, display processor 412 incorporates circuitry optimized for general purpose processing. In yet another configuration, display processor 412 may be integrated with one or more other system elements, such as the memory bridge 405, CPU 302, and I/O bridge 407 to form a system on chip (SoC). In still further configurations, display processor 412 is omitted and software executed by CPU 402 performs the functions of display processor 412.

Pixel data can be provided to display processor 412 directly from CPU 402. In some configurations, instructions and/or data representing a scene are provided to a render farm or a set of server computers, each similar to system 400, via network adapter 418 or system disk 414. The render farm generates one or more rendered images of the scene using the provided instructions and/or data. These rendered images may be stored on computer-readable media in a digital format and optionally returned to system 400 for display. Similarly, stereo image pairs processed by display processor 412 may be output to other systems for display, stored in system disk 414, or stored on computer-readable media in a digital format.

Alternatively, CPU 402 provides display processor 412 with data and/or instructions defining the desired output images, from which display processor 412 generates the pixel data of one or more output images, including characterizing and/or adjusting the offset between stereo image pairs. The data and/or instructions defining the desired output images can be stored in system memory 404 or graphics memory within display processor 412. In one configuration, display processor 412 includes 3D rendering capabilities for generating pixel data for output images from instructions and data defining the geometry, lighting, shading, texturing, motion, and/or camera parameters for a scene. Display processor 412 can further include one or more programmable execution units capable of executing shader programs (also referred to herein as "shaders"), tone mapping programs, and the like.

It will be appreciated that the system shown herein is illustrative and that variations and modifications are possible. The connection topology, including the number and arrangement of bridges, may be modified as desired. For instance, in some configurations, system memory 404 is connected to CPU 402 directly rather than through a bridge, and other devices communicate with system memory 404 via memory bridge 405 and CPU 402. In other alternative topologies display processor 412 is connected to I/O bridge 407 or directly to CPU 402, rather than to memory bridge 405. In still other configurations, I/O bridge 407 and memory bridge 405 might be integrated into a single chip. The particular components shown herein are optional; for instance, any number of add-in cards or peripheral devices might be supported. In some aspects, switch 416 is eliminated, and network adapter 418 and add-in cards 420, 421 connect directly to I/O bridge 407.

According to aspects disclosed herein, subsurface scattering effects are computed using a normalized diffusion profile. The shader may apply a ray tracing, point-based, or other rendering approach to evaluate the subsurface scattering. To compute subsurface scattering via ray tracing, the shader may trace a ray into a volume and trace one or more additional rays outwards from a point within the volume, as discussed above with respect to FIG. 2. Where the additional rays intersect the model, the shader evaluates the normalized diffusion profile to determine how much of the light traced into the volume exits at the intersection points. In one aspect, the normalized diffusion profile may be of the form $$R_d(r) = \frac{1}{(2\pi(ab+cd))}\left[a\frac{e^{-r/b}}{r} + c\frac{e^{-r/d}}{r}\right].$$

An integral of the normalized diffusion profile giving outgoing radiance due to subsurface scattering may be added to the standard rendering equation as an additional term. To determine the lit surface color of a pixel due to subsurface scattering, the shader may multiply integrals of $R_d(r)$, computed for normalized diffusion profiles for each of the R, G, and B components of color, by corresponding components of a diffuse color constant, which may be, e.g., a color painted by an artist on a color map associated with the surface. Further, because $R_d(r)$ is analytically integrable, it may be integrated in importance sampling to obtain a cumulative density function. The inverse of the cumulative density function may be used to generate, for each ray traced to a surface, sample points on the surface at which to evaluate the normalized diffusion profile, as discussed above with respect to FIG. 3.

Certain aspects may be implemented as one or more shaders executed by display processor 112. Although discussed herein primarily with respect to such shaders, other configurations of may be implemented in software stored in system memory 104 and executed by CPU 102 and/or display processor 112. Still further configurations may be implemented in fixed function hardware included within display processor 112. Other configurations may be implemented as a combination of hardware and software.

Advantageously, techniques disclosed herein permit efficient rendering of relatively realistic images that include subsurface scattering effects. The diffusion profiles disclosed herein are normalized such that no energy is lost. As a result, a surface texture color desired by an artist may be obtained by simply multiplying by a color value, thereby providing a higher degree of artistic control. The normalized diffusion profile may also match the characteristics of the full scattering solution including all numbers of scattering events, unlike previous diffusion models, which did not model single scattering events. Further, samples may be easily generated with a distribution that matches the diffusion profile, as the diffusion profile is analytically integrable.

In addition, the scaling function disclosed herein compensates for out-of-plane scattering so that forward scattering media and non-planar surfaces may be rendered more realistically.

The foregoing description references aspects of the disclosure. However, it should be understood that the disclosure is not limited to specific described aspects. Instead, any combination of the following features and elements, whether related to different aspects or not, is contemplated to implement and practice the disclosure. Furthermore, although aspects of the disclosure may achieve advantages over other possible solutions and over the prior art, whether or not a particular advantage is achieved by a given aspect is not limiting of the disclosure. Thus, the following aspects, features, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may be embodied as a system, method or computer program product. Accordingly, aspects of the present disclosure may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various aspects of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and flowchart illustrations, and combinations of blocks in the block diagrams and flowchart illustrations can be implemented by special-purpose hardware-based systems that perform the specified functions or acts, or combinations of special purpose hardware and computer instructions.

While the foregoing is directed to aspects of the present disclosure, other and further aspects may be devised without departing from the basic scope thereof, and the scope thereof is determined by the claims that follow.

What is claimed is:

1. A computer-implemented method for rendering an image which includes subsurface scattering effects, comprising:
    evaluating, for each of one or more points on a surface, at least a respective integral of an integrand over the surface to estimate light transport to the one or more points on the surface, wherein the integrand includes a normalized diffusion profile and an integral of the normalized diffusion profile over radii in a plane assuming uniform incident lighting evaluates to one; and
    displaying at least a rendered image as output on a display device, wherein lit surface colors of one or more pixels in the rendered image due to subsurface scattering are determined, at least in part, based on the evaluated integrals at the one or more points on the surface.

2. The method of claim 1, wherein the integrals at the one or more points on the surface are evaluated numerically, and wherein the method further comprises generating sampling points on the surface at which to determine values of the normalized diffusion profile, the sampling points being generated based on an inverse of a cumulative density function associated with the normalized diffusion profile.

3. The method of claim 1, further comprising, scaling one or more of the evaluated integrals based on a scaling function which compensates for out-of-plane scattering.

4. The method of claim 3, wherein the scaling function returns a value between one and a predefined constant based on positions of incident and outgoing light and orientations of surface normals at the incident and outgoing light positions.

5. The method of claim 1, wherein the normalized diffusion profile has the form $$R_d(r) = \frac{1}{(2\pi(ab+cd))}\left[a\frac{e^{-r/b}}{r} + c\frac{e^{-r/d}}{r}\right],$$

with a, b, c, and d being constants.

6. The method of claim 5, wherein the ratio of b to d is substantially 3.

7. The method of claim 1,
    wherein one integral for each of a red, green, and blue color component is evaluated for each of the one or more points, and
    wherein determining the lit surface colors of the one or more pixels includes multiplying each of the evaluated integrals with a component of a diffuse color constant for one of the points which is associated with the integral.

8. The method of claim 7, wherein the diffuse color constant is a value selected from a color map associated with the surface.

9. The method of claim 1, wherein the integrals at the one or more points on the surface are evaluated using one of a point-based and a ray-tracing rendering technique.

10. A non-transitory computer-readable storage media storing instructions, which when executed by a computer system, perform operations for rendering an image which includes subsurface scattering effects, the operations comprising:
    evaluating, for each of one or more points on a surface, at least a respective integral of an integrand over a surface to estimate light transport to the one or more points on the surface, wherein the integrand includes a normalized diffusion profile and an integral of the normalized diffusion profile over radii in a plane assuming uniform incident lighting evaluates to one; and
    displaying at least a rendered image as output on a display device, wherein lit surface colors of one or more pixels in the rendered image due to subsurface scattering are determined, at least in part, based on the evaluated integrals at the one or more points on the surface.

11. The computer-readable storage media of claim 10, wherein the integrals at the one or more points on the surface are evaluated numerically, and wherein the operations further comprise generating sampling points on the surface at which to determine values of the normalized diffusion profile, the sampling points being generated based on an inverse of a cumulative density function associated with the normalized diffusion profile.

12. The computer-readable storage media of claim 10, the operations further comprising, scaling one or more of the evaluated integrals based on a scaling function which compensates for out-of-plane scattering.

13. The computer-readable storage media of claim 12, wherein the scaling function returns a value between one and a predefined constant based on positions of incident and outgoing light and orientations of surface normals at the incident and outgoing light positions.

14. The computer-readable storage media of claim 10, wherein the normalized diffusion profile has the form $$R_d(r) = \frac{1}{(2\pi(ab+cd))}\left[a\frac{e^{-r/b}}{r} + c\frac{e^{-r/d}}{r}\right],$$

with a, b, c, and d being constants.

15. The computer-readable storage media of claim 14, wherein the ratio of b to d is substantially 3.

16. The computer-readable storage media of claim 10,
    wherein one integral for each of a red, green, and blue color component is evaluated for each of the one or more points, and
    wherein determining the lit surface colors of the one or more pixels includes multiplying each of the evaluated integrals with a component of a diffuse color constant for one of the points which is associated with the integral.

17. The computer-readable storage media of claim 16, wherein the color value is a value selected from a color map associated with the surface.

18. The computer-readable storage media of claim 10, wherein the integrals at the one or more points on the surface are evaluated using one of a point-based and a ray-tracing rendering technique.

19. A system, comprising:
    a processor; and a memory, wherein the memory includes an application program configured to perform operations for rendering an image which includes subsurface scattering effects, the operations comprising:

evaluating, for each of one or more points on a surface, at least a respective integral of an integrand over a surface to estimate light transport to the one or more points on the surface, wherein the integrand includes a normalized diffusion profile and an integral of the normalized diffusion profile over radii in a plane assuming uniform incident lighting evaluates to one, and displaying at least a rendered image as output on a display device, wherein lit surface colors of one or more pixels in the rendered image due to subsurface scattering are determined, at least in part, based on the evaluated integrals at the one or more points on the surface.

20. The system of claim 19, wherein the integrals at the one or more points on the surface are evaluated numerically, and wherein the operations further comprise generating sampling points on the surface at which to determine values of the normalized diffusion profile, the sampling points being generated based on an inverse of a cumulative density function associated with the normalized diffusion profile.

21. The system of claim 19, the operations further comprising, scaling one or more of the evaluated integrals based on a scaling function which compensates for out-of-plane scattering.

22. The system of claim 19, wherein the normalized diffusion profile has the form $$R_d(r) = \frac{1}{(2\pi(ab+cd))}\left[a\frac{e^{-r/b}}{r} + c\frac{e^{-r/d}}{r}\right],$$

with a, b, c, and d being constants, and wherein the ratio of b to d is substantially 3.

23. The system of claim 19, wherein one integral for each of a red, green, and blue color component is evaluated for each of the one or more points, and wherein determining the lit surface colors of the one or more pixels includes multiplying each of the evaluated integrals with a component of a diffuse color constant for one of the points which is associated with the integral.

* * * * *

UNITED STATES PATENT AND TRADEMARK OFFICE
CERTIFICATE OF CORRECTION

PATENT NO. : 9,659,404 B2
APPLICATION NO. : 13/840814
DATED : May 23, 2017
INVENTOR(S) : Brent Burley et al.

Page 1 of 1

It is certified that error appears in the above-identified patent and that said Letters Patent is hereby corrected as shown below:

In the Specification

In Column 2, Line 47, delete "107_" and insert -- 107i --, therefor.

In Column 6, Line 35, delete "ft," and insert -- fbc --, therefor.

In Column 7, Lines 9-10, delete "$\int\Omega f_r(x, \vec{\omega}_i, \vec{\omega}_o)$" and insert -- $\int_\Omega f_r(x, \vec{\omega}_i, \vec{\omega}_o)$ --, therefor.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*